United States Patent

Zievers

[15] 3,648,842
[45] Mar. 14, 1972

[54] FILTRATION APPARATUS

[72] Inventor: James F. Zievers, La Grange, Ill.

[73] Assignee: Industrial Filter & Pump Mfg. Co., Cicero, Ill.

[22] Filed: Jan. 29, 1969

[21] Appl. No.: 794,917

[52] U.S. Cl. .......................................... 210/237, 210/387
[51] Int. Cl. .......................................................... B01d 29/02
[58] Field of Search ............... 210/330, 332, 387, 456, 465, 210/470; 210/237, 238

[56] References Cited

UNITED STATES PATENTS

| 1,945,668 | 2/1934 | Turner | 210/456 X |
|---|---|---|---|
| 2,055,874 | 9/1936 | Manning | 210/387 X |
| 2,874,848 | 2/1959 | Cannon et al. | 210/332 |
| 2,907,466 | 10/1959 | Beddow | 210/456 X |
| 3,187,896 | 6/1965 | Wilkinson | 210/470 X |
| 3,195,729 | 7/1965 | Kracklauer et al. | 210/330 |
| 3,224,587 | 12/1965 | Schmidt, Jr. | 210/330 |
| 3,295,689 | 1/1967 | Arvanitakis | 210/330 X |

*Primary Examiner*—J. L. DeCesare
*Attorney*—Fidler, Bradley, Patnaude and Lazo

[57] ABSTRACT

Filtration apparatus for filtering radioactive or highly toxic materials includes a filter tank and a disposable filter cartridge removably mounted in the tank and including a plurality of filter rolls and a rotatable take-up spool mounted in a perforate container. The take-up spool mates with a drive shaft in the tank and is rotated to remove the plugged outer windings or layers from the rolls to expose a fresh filtering surface. After the filter rolls have been completely unwound, the filter cartridge, including the used filter material and any filter cake which may have been deposited thereon can be removed from the tank and replaced with a fresh cartridge without exposure to the operating personnel.

8 Claims, 3 Drawing Figures

PATENTED MAR 14 1972

INVENTOR
James F. Zievers
BY
Fidler, Bradley & Patnaude
ATTYS.

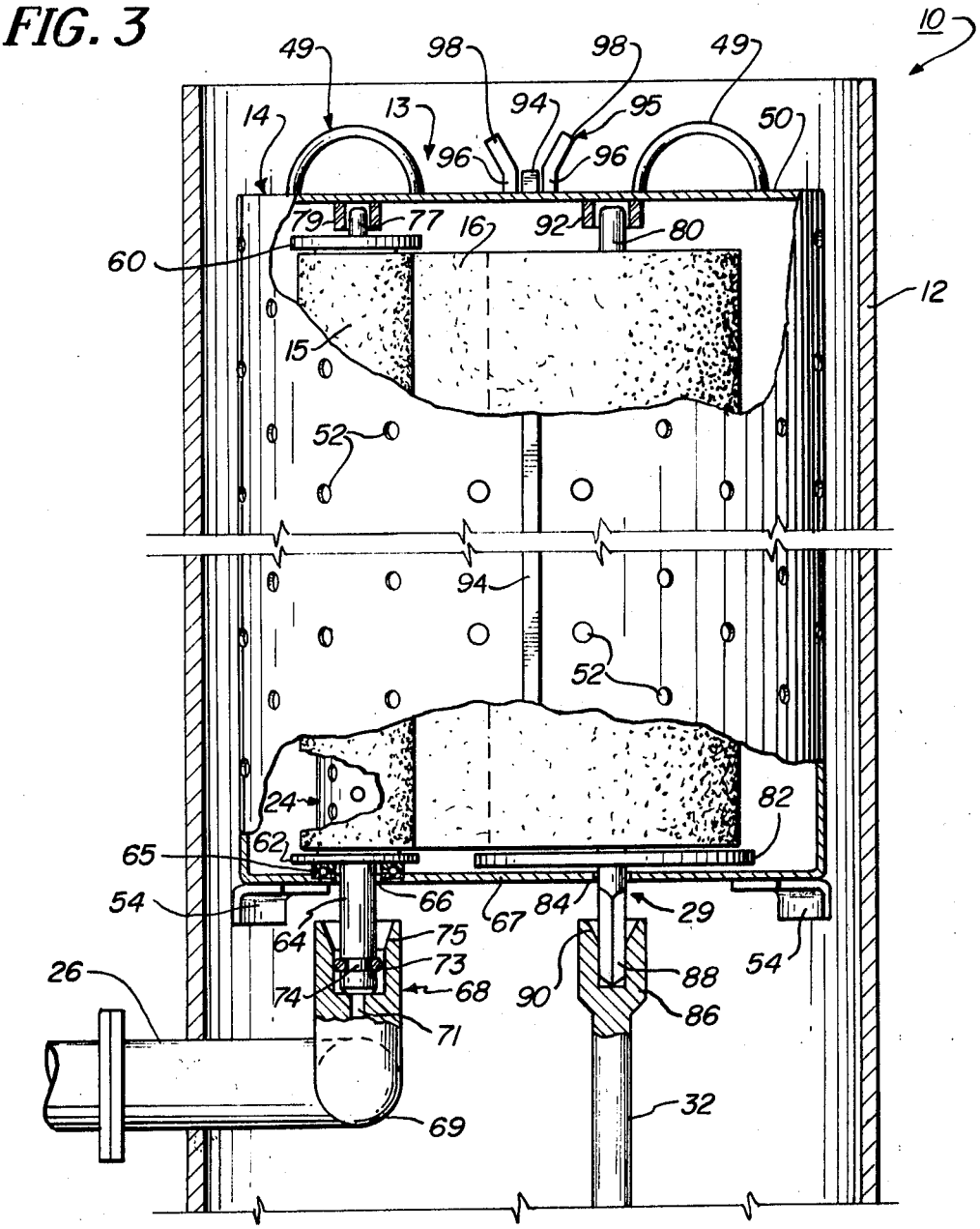

FILTRATION APPARATUS

The present invention relates to filtration apparatus, and it more particularly relates to a new and improved filtering apparatus employing a fabric or paper filter medium for removing undesirable particles from a liquid.

The treatment and processing of radioactive materials frequently requires filtering of entrained solids from a liquid, and handling of these radioactive solids after removal thereof from the liquid has presented a difficult and potentially dangerous problem. It would be desirable, therefore, to provide a filter which is particularly suited for use with radioactive materials and which enables the removal of the filtered solids from the filter and permits disposal thereof with a minimum, if any, exposure by the operating personnel.

A principal object of the present invention is to provide a new and improved filtering apparatus.

Another object of the present invention is to provide new and improved filtering apparatus for use with radioactive or highly toxic materials without undue exposure of the personnel to harmful radiation or fumes and without other undesirable contact with the contaminated apparatus or materials.

Briefly, the above and further objects of the present invention may be realized by providing a roll type filtering apparatus which includes a filter tank and a disposable, self-contained, filter cartridge removably mounted in the filter chamber of the tank. The filter cartridge includes a plurality of rolls of sheet filter material connected to a take-up spool rotatably mounted in a perforate container. When the cartridge is placed in the tank, the take-up spool mates with a drive-shaft in the filter tank and may thus be rotated to unwind the outer layers of the filter material from the rolls onto the take-up spool. After the filter material has been completely unwound from the rolls, the entire cartridge can be removed from the tank by suitable means, such as a remotely-operated crane, and placed in a sealable drum or the like for ultimate disposal. A fresh cartridge may then be placed in the tank by the same crane, the top of the filter tank closed and the filter returned to service.

The invention, both as to its organization and method of operation, together with further objects and advantages thereof will best be understood by reference to the following detailed description taken in connection with the accompanying sheets of drawings, wherein:

FIG. 3 is an enlarged, fragmentary cross-sectional view of the filter of FIG. 1.

Figure 1:
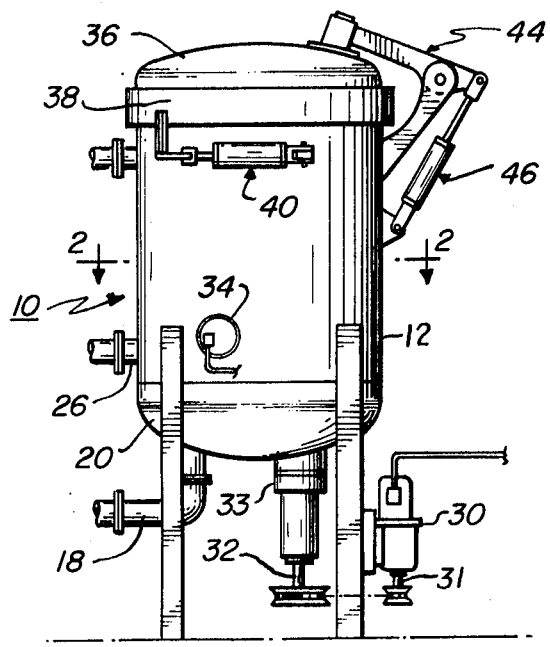
FIG. 1 is an elevational view, partly broken away, of a filtering apparatus embodying the present invention.

Referring now to the drawings, there is shown a filtering apparatus 10 which includes a generally cylindrical tank 12 enclosing a filter chamber. A self-contained, replaceable cartridge 13 is mounted in the tank 12 and includes a perforate cylindrical container 14 which encloses a plurality of filter rolls 15 each including a plurality of layers or turns of a continuous sheet of a filter material 16. The filter material 16 is preferably an unwoven fabric or a high grade filter paper, such as parchment. Although two filter rolls are shown in the drawings for purposes of illustration, it is to be understood that more or fewer such rolls may be employed.

Figure 2:
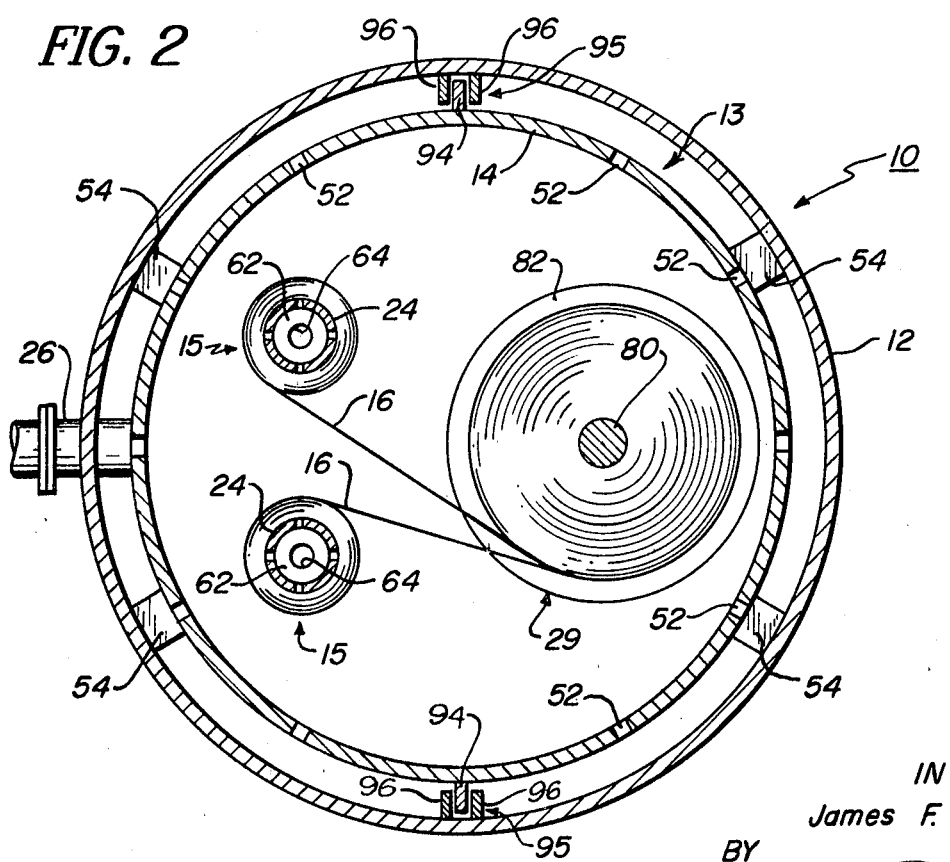
FIG. 2 is an enlarged cross-sectional view of the filter shown in FIG. 1 and taken along the line 2—2 thereof.

An inlet 18 through which a liquid to be clarified is pumped from a remote area, extends through the bottom wall 20 of the tank 12 and opens into the filter chamber. As shown in FIGS. 2 and 3, the filter rolls 15 each comprise a relatively large number of turns of the filter material 16 wound on a perforate tube 24 rotatably connected to an outlet pipe 26.

In operation, the liquid to be filtered enters the inlet 18, passes through the rolls 15, and then leaves the tank 12 via the outlet 26. In passing through the plurality of turns of filter material 16 on each roll, those particles which are suspended in the liquid and which have a size exceeding that of the pores in the filter material 16 are deposited on or in the outside turns or layers of the filter material 16 on the rolls 15. Where a good grade of filter material 12 is used, little, if any, filtering is effected by the inner turns of the filter rolls 15, the only action of the inner turns being to cause a small increase in the pressure drop through the rolls 15. Since the filter 10 is designed for use in a pressurized rather than a vacuum type system, this increase in the pressure drop through the filter 10 is of little consequence.

After the filter 10 has been in use for a considerable period of time, the outside turns of the filter material ordinarily become plugged so that the energy which must be expended to force the liquid through the filter material becomes so great as to reduce the efficiency of operation of the filter 10 below an economical level. At this time, a common take-up spool 29, which is rotatably mounted in the container 14 and to which the outside turns of the filter material 16 on each of the rolls 15 is connected, is rotated in a counterclockwise direction as viewed in FIG. 2 to unwind the plugged outer turns of the filter material 16 from the rolls 15. As best shown in FIG. 2, the rolls 15 are wound on their supporting tubes in opposite directions to one another so that when the outer plugged or caked portions of the material are unwound, the outer plugged and/or caked surfaces face one another. The plugged filter material is thus removed from the path of fluid flow through the filter 10 and the efficiency of operation returns to the normal level until the newly exposed turns of filter material again become plugged or caked. The above-described cycle of operation is repeated until the unexposed filter material on the rolls 15 has been exhausted.

As shown in FIG. 1, an electric drive motor 30 has a vertically-disposed drive shaft 31 which is drivingly connected to a vertical shaft 32 which extends through the bottom wall 20 of the tank 12 to drive the take-up spool 29. A thrust bearing and sealing unit 33 is mounted on the outside of the bottom wall 20 and surrounds the shaft 32 to support the spool 29 and the heavy plugged portion of the filter material 16. The drive motor 30 is controlled from a remote location to rotate the take-up spool 29 thereby to advance the outer layers of the filter material 16 from the rolls 15. In order to unwind only one turn from each of the rolls 15, there is provided suitable control means (not shown), such as a pressure sensitive switch which energizes the drive motor 30 to rotate the take-up spool 29 in response to a given decrease in the outlet pressure in the filter 10, and when a single turn of the filter material is unwound from each of the rolls 15, the outlet pressure rises sufficiently to open the pressure sensitive switch, thereby de-energizing the motor 30. For a detailed explanation of a suitable control means for controlling the advancement of the filter material, reference may be made to U.S. Pat. No. 3,224,587.

After each revolution of the rolls 15, a cycle counter 34 mounted on the exterior of the tank 12 is actuated by suitable means (not shown), such as a stud on one of the rolls 15, to count the number of cycles of the rolls so that when almost all of the filter material 16 is unwound from the supporting tubes 24, the counter 34 generates an electric signal which is sent to a control panel (not shown) in the remote location beyond the contaminated area for the purpose of notifying the operating personnel of the need for a fresh cartridge. When the signal is generated, a few turns of the filter material 16 remain in place on the tubes 24 to prevent unfiltered liquid from passing into the outlet 26. Should these few turns become plugged, the pressure in the filter chamber increases above a predetermined value and causes a suitable control means (not shown), such as a pressure safety switch, to shut down the filter.

In accordance with the present invention, in order to replace the used filter material with new material, the cartridge 13 is removably mounted in the filter chamber of the tank 12 so that it can be readily removed therefrom and disposed of in a suitable manner without exposing the personnel to harmful or other undesirable contact with the contaminated apparatus or materials as described hereinafter. In order to remove the cartridge 13 so that a fresh cartridge can be inserted into the tank 12, the filter 10 is temporarily taken out of service by closing suitable valves (not shown) in the input and output lines to and from the inlet and outlet of the filter. The cover 36 is normally locked in place by means of a locking ring 38 which may be rotated to an unlocked position from a remote location outside of the contaminated area by means of a remotely-controlled hydraulic cylinder assembly 40. The cover 36 is then moved to an open position by means of a remotely-controlled hydraulic cylinder assembly 46 and a lever mechanism 44.

In order to remove the cartridge 13 from the tank 12, a crane (not shown) may be attached to a pair of lifting lugs 49 on the top wall 50 of the container 14. For the purpose of safely removing the container 14 from the premises, the container 14 may be immediately inserted into a sealable drum (not shown) which is then hermetically sealed. A fresh cartridge 13 is then inserted into the tank 12 by means of the crane, the cover 36 is closed and locked in place by the locking ring 38, and the filter returned to service.

Considering now the construction of the cartridge 13 in greater detail and with reference to FIGS. 2 and 3 of the drawings, the container 14 is closed at both of its ends and is perforated with a plurality of relatively large holes 52. When in the tank 12, the container 14 rests on the top surface of a plurality of spaced-apart brackets 54 which extend from and are mounted as by welding on the inner wall of the tank 12. Each of the filter rolls 15 comprises a relatively large number of turns of the filter material 16 is wound on the perforated tube 24, and a pair of end caps 60 and 62 are respectively provided with portions of reduced size which tightly and sealably fit into the ends of the tube 24. The cap 60, which is positioned at the top of the tube 24, is imperforate and the cap 62, which is positioned at the bottom of the tube 24, has a central bore in which a tubular connector 64 is press-fitted or otherwise secured. For the purpose of supporting the rolls 15, each of the connectors 64 is surrounded by an annular thrust bearing 65 in the container 14. Moreover, each of the connectors 64 extends through a hole 66 in the bottom wall 67 of the container 14 and is adapted to fit into a female connector 68 permanently mounted in the tank 12. The connectors 68 are mounted at the ends of a manifold 69 which is connected at its center in fluid communication with the outlet 26. During the filtering operation, the filtrate from the rolls 15 flows through the tubular connectors 64 and enters the manifold 69 via the female connectors 68, each of which has an opening 71 to permit the filtrate to empty into the manifold 69. Each of the annular connectors 64 has a resilient O-ring 73 which fits in a peripheral groove 74 in its exit end to seal it to the female connector 68. The bore in each of the female connectors 68 is outwardly tapered at its upper end 75 to guide the connector 64 into the female connector 68 when the cartridge is placed in the tank. On each of the rolls 15 an up-standing pin 77 on the top plate 60 fits loosely in a retaining collar 79 mounted on the inside of the top wall 50 of the container 14. When the filter paper is unwound from the tube 24, each of the connectors 64 rotates in its female connector 68, and each of the pins 77 is free to rotate in its collar 79.

The take-up spool 29 comprises a spindle 80 on which the used portions of the sheets of filter material 16 are wound. The used filter material 16 is relatively heavy inasmuch as it is soaked with the liquid being filtered, and, therefore, the spool 29 includes a base plate 82 which is fixedly connected to the spindle 80 to support the used filter material 16 in the event that it should sag downwardly. The bottom end portion of the spindle 80 extends through a hole 84 in the bottom wall of the container 14 and into engagement with a female connector 86 of the shaft 32 for the drive motor 30. The bottom end of the spindle 80 has a plurality of flats 88 which mate with corresponding flats in the connector 86 to drivingly connect the female connector 86 to the spindle 80. In order to guide the bottom end of the spindle 80 into the connector 86, the socket of the connector 86 is tapered outwardly at its upper end 90. The top end of the spindle 80 is loosely received by a retaining collar 92 mounted on the top wall 50. Thus, the shaft 32 and the thrust bearing assembly 33 support the take-up spool 29 such that when the cartridge 13 is inserted into the tank 12, the bottom plate 82 is raised above the bottom wall 67 of the container 14. As a result, the frictional resistance between the spool 29 and the container 14 is minimized. If desired, a suitable thrust bearing (not shown) may surround the spindle 80 on the bottom wall 67.

In order to properly align the cartridge 13 relative to the tank 12 when it is lowered into the tank 12, a pair of guide rails 94 extend along opposite sides of the container 14 and are received between a pair of diametrically opposed guide tracks 95 secured to and extending along the inner walls of the tank 14. Each guide track comprises a pair of rails 96 having outwardly flared upper end portions 98 to guide the rails 94 into the guide tracks. When the cartridge 13 is lowered into the tank 12, the guide rails 94 thus cause the cartridge 13 to be guided directly into its final resting position in which the connectors 64 for the rolls 15 and the bottom end of the spindle 80 are received in their respective female connectors 68 and 86.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

I claim:

1. Filtration apparatus comprising
   a filter tank defining a filter chamber and having an inlet and an outlet;
   a perforate container adapted to be removably supported within said chamber;
   means for removably mounting said container in said chamber;
   at least one filtration unit mounted in said container, said unit including a perforate hollow support and a plurality of contiguous layers of a filter material wound on said perforate hollow support to form a roll;
   a take-up spool rotatably mounted in said container and adapted to be connected to the filter material on said hollow support;
   means for detachably connecting said hollow support to said outlet in fluid communication therewith;
   driving means for rotating said spool to unwind said filter material from said support, said driving means having an output; and
   means for detachably connecting said output of said driving means to said spool,
   whereby said container and its contents can be removed as an assembled unit from said tank when said filter material becomes exhausted and a fresh container replaced in said tank.

2. Filtration apparatus according to claim 1, wherein said means for removably mounting said container in said chamber comprises a plurality of mounting brackets secured to the inner wall of the filter tank for supporting said container from below, said container resting on the top surfaces of said brackets.

3. Filtration apparatus according to claim 1, wherein said means for detachably connecting said hollow support to said outlet includes a tubular connector connected in fluid communication with said hollow support and extending through an aperture in the bottom wall of said container, and a female connector connected in fluid communication with said outlet for receiving said connector.

4. Filtration apparatus according to claim 3, further including a resilient O-ring surrounding said tubular connector to seal the tubular connector to said female connector.

5. Filtration apparatus according to claim 3, wherein means for detachably connecting said output of said driving means to said spool includes a female connector fixedly connected to said output of said driving means for receiving an end portion of said spool extending through an aperture in the bottom wall of said container.

6. Filtration apparatus according to claim 5, further including a pair of guide strips secured to and extending along opposite sides of the perforate container on the outside thereof and a pair of guide tracks extending along opposite sides of the inner wall of the filter tank to receive said guide strips therebetween to guide the container as it is inserted into the filter chamber so that the tubular connector is positioned in proper alignment with its female connector and said spool is positioned in proper alignment with said female connector of said drive means.

7. A cartridge adapted for use in a filter tank having an inlet and an outlet and having supporting means for removably mounting said cartridge in its filter chamber, said tank including driving means, said cartridge comprising:

a perforate container adapted to be removably supported by said supporting means within said filter chamber of said filter tank;

at least one filtration unit mounted in said container and having means adapted to be removably connected in fluid communication to said outlet, said unit including a perforate hollow support and a plurality of contiguous layers of a filter material wound on said hollow support to form a roll; and a take-up spool in said container adapted to be drivingly and removably connected to said driving means and adapted to be connected to the filter material on said hollow support so that said driving means can rotate said spool to unwind said filter material from said support, whereby said container and its contents can be removed as an assembled unit from said tank when said filter material becomes exhausted and a fresh container replaced in said tank.

8. A cartridge according to claim 7, wherein said tank includes a pair of guide tracks extending along opposite sides of the inner walls thereof, said cartridge including a pair of guide strips secured to and extending along opposite sides of the perforate container on the outside thereof, said strips being adapted to be received by said guide tracks to guide the container as it is inserted into the filter chamber.

\* \* \* \* \*